(12) United States Patent
McCabe et al.

(10) Patent No.: US 8,195,366 B2
(45) Date of Patent: Jun. 5, 2012

(54) CONTROL SYSTEM FOR A PALLET TRUCK

(75) Inventors: Paul P. McCabe, Binghamton, NY (US);
Douglas D Fett, Binghamton, NY (US);
Bryce A. Gregory, Binghamton, NY (US)

(73) Assignee: The Raymond Corporation, Greene, NY (US)

( * ) Notice: Subject to any disclaimer, the term of this patent is extended or adjusted under 35 U.S.C. 154(b) by 618 days.

(21) Appl. No.: 11/854,612

(22) Filed: Sep. 13, 2007

(65) Prior Publication Data

US 2009/0076664 A1 Mar. 19, 2009

(51) Int. Cl.
*G06F 7/70* (2006.01)
*G06F 19/00* (2011.01)
*G06G 7/00* (2006.01)
*G06G 7/76* (2006.01)

(52) U.S. Cl. .................. 701/50; 701/2; 180/315; 172/2
(58) Field of Classification Search ................ 701/2, 50; 180/315; 37/412, 348, 382, 414; 172/2
See application file for complete search history.

(56) References Cited

U.S. PATENT DOCUMENTS

| | | | |
|---|---|---|---|
| 3,791,474 A | 2/1974 | Stammen et al. | |
| 4,379,497 A | 4/1983 | Hainsworth et al. | |
| 4,464,659 A | 8/1984 | Bergqvist | |
| 4,623,032 A | 11/1986 | Kemmer | |
| 4,802,096 A | 1/1989 | Hainsworth et al. | |
| 4,849,735 A | 7/1989 | Kirtley et al. | |
| 4,928,101 A | 5/1990 | Favors | |
| 4,937,795 A | 6/1990 | Motegi et al. | |
| 5,036,935 A | 8/1991 | Kohara | |
| 5,258,911 A | 11/1993 | Wellman et al. | |
| 5,511,749 A | 4/1996 | Horst et al. | |
| 5,621,382 A * | 4/1997 | Yamamoto | 340/432 |
| 5,625,336 A * | 4/1997 | Yamamoto | 340/432 |
| 5,964,313 A * | 10/1999 | Guy | 180/332 |
| RE36,470 E * | 12/1999 | Woll et al. | 342/71 |
| 6,125,935 A * | 10/2000 | Shahin, Jr. | 166/250.14 |
| 6,464,025 B1 * | 10/2002 | Koeper et al. | 180/19.2 |
| 6,595,306 B2 | 7/2003 | Trego et al. | |
| 6,650,242 B2 | 11/2003 | Clerk et al. | |
| 6,684,264 B1 * | 1/2004 | Choi | 710/15 |
| 6,799,099 B2 | 9/2004 | Zeitler et al. | |
| 6,873,490 B2 * | 3/2005 | Guo et al. | 360/78.07 |
| 6,883,625 B2 | 4/2005 | Trego et al. | |
| 7,017,689 B2 * | 3/2006 | Gilliland et al. | 180/19.1 |
| 7,101,475 B1 * | 9/2006 | Maaske et al. | 210/106 |
| 7,121,762 B2 * | 10/2006 | Quenzi et al. | 404/84.1 |
| 2003/0120389 A1 * | 6/2003 | Abramson et al. | 700/245 |
| 2006/0231302 A1 | 10/2006 | Rose | |
| 2006/0243517 A1 * | 11/2006 | Lohmann | 180/333 |
| 2006/0245866 A1 | 11/2006 | Rose et al. | |
| 2007/0137904 A1 * | 6/2007 | Rose et al. | 180/19.1 |
| 2008/0021627 A1 * | 1/2008 | Johnsson | 701/96 |

(Continued)

FOREIGN PATENT DOCUMENTS

JP 01196606 A 8/1989
(Continued)

*Primary Examiner* — Jack W Keith
*Assistant Examiner* — Rami Khatib
(74) *Attorney, Agent, or Firm* — Quarles & Brady LLP (57) ABSTRACT

A control system for controlling motion of a pallet truck vehicle includes three modes of operation for controlling coasting of the vehicle. In a first, constant pressure mode, the vehicle coasts for as long as an activation button is depressed. In a second, time controlled mode, the vehicle coasts for a predetermined period of time. In the third, distance controlled mode, the vehicle coasts for a predetermined distance. Each of these functions can be activated from a remote location using a remote activation device.

21 Claims, 8 Drawing Sheets

U.S. PATENT DOCUMENTS

| | | |
|---|---|---|
| 2008/0039645 A1 | 2/2008 | Chaves et al. |
| 2008/0071429 A1* | 3/2008 | Kraimer et al. ............ 701/2 |
| 2008/0086241 A1* | 4/2008 | Phillips et al. ............ 701/2 |
| 2008/0129445 A1* | 6/2008 | Kraimer et al. ............ 340/5.2 |

FOREIGN PATENT DOCUMENTS

| | | |
|---|---|---|
| JP | 05254795 A | 10/1993 |
| JP | 05254796 A | 10/1993 |
| WO | 2008039649 A2 | 4/2008 |

* cited by examiner

FIG. 11

CONTROL SYSTEM FOR A PALLET TRUCK

FIELD OF THE INVENTION

The present invention provides an improved method and apparatus for efficiently providing coast functions in a pallet truck or other similar vehicle.

BACKGROUND

In warehouses today, especially large, high volume warehouses, productivity is very important to achieving timely movement of materials. Every facet of vehicle and operator movement is scrutinized for opportunities to reduce wasted time and motion.

One of the key processes used in achieving high efficiency is "low-level orderpicking." In this procedure, forklift trucks, especially pallet trucks, end rider trucks, and center rider trucks, are used to pick cartons from pallets in racking systems from low-level positions and to place one load onto pallets located on the vehicle. The trucks are typically configured to include a "deadman" brake that is activated when the steering arm is released, as, for example, when the operator leaves the vehicle. Therefore, in typical operation, the vehicle stops whenever the operator leaves the vehicle to pick a carton.

To improve the efficiency of orderpicking, the vehicle can be provided with a coast system. The coast system is typically activated by a truck-mounted switch or switches and, when activated, prevents activation of the deadman brake when the handle is released, allowing the vehicle to continue to move or "coast" when the operator leaves the vehicle to retrieve a carton before returning to place it on the forks. These systems improve efficiency and can allow operators to achieve productivity levels of 2-3 picks per minute for short periods of time.

While improving efficiency, however, time is lost and motion wasted by requiring the operator to continuously return to the control handle of the vehicle. There is therefore a limit to the amount of operator productivity improvement possible with these methods unless the operator's movements can be more efficiently utilized. The present invention addresses these problems.

SUMMARY OF THE INVENTION

In one aspect, the present invention provides a method and apparatus for activating the travel command (jog feature) of a truck in a remote position. The activation of the travel command is provided through a remote control, typically within several few feet of the truck. As described more fully below, the remote control can be provided as part of a wireless control system, through voice activation, or in other ways.

In another aspect of the invention, an improved pallet truck of the type having a deadman brake that activates when a condition is sensed indicating that an operator has left the vehicle and a coast system for selectively overriding the deadman brake to allow the vehicle to coast is provided. The improved pallet truck includes a selector for selecting between a constant pressure-controlled coast function, a time controlled coast function, and a distance controlled coast function.

In yet another aspect of the invention, a pallet truck is provided including a steerable wheel, a brake coupled to said wheel, and a steering arm coupled to said wheel for steering said wheel. The steering arm is movable through an arc including a driving arc interposed between a generally vertical braking position and a generally horizontal braking position. A deadman mechanism is coupled to the steering arm for moving the steering arm into at least one of the generally vertical braking position and said generally horizontal braking position to brake the truck when said handle is released. A vehicle control system receives control signals from the steering arm and provides control signals to the brake. A coast device is provided coupled to the steering arm for locking the steering arm within said driving arc, the coast device preventing movement of the steering arm from activating the deadman mechanism when the steering arm is released. A selector is provided for selecting between a time control coast function, a distance control coast function, and a constant pressure coast function. A coast activation control, which can be a remote control device, is provided for activating said coast device, the remote control providing a coast signal to the vehicle control system to activate the selected one of the time control coast function, the distance control coast function and the constant pressure coast function.

These and other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE PREFERRED EMBODIMENTS

Figure 1:
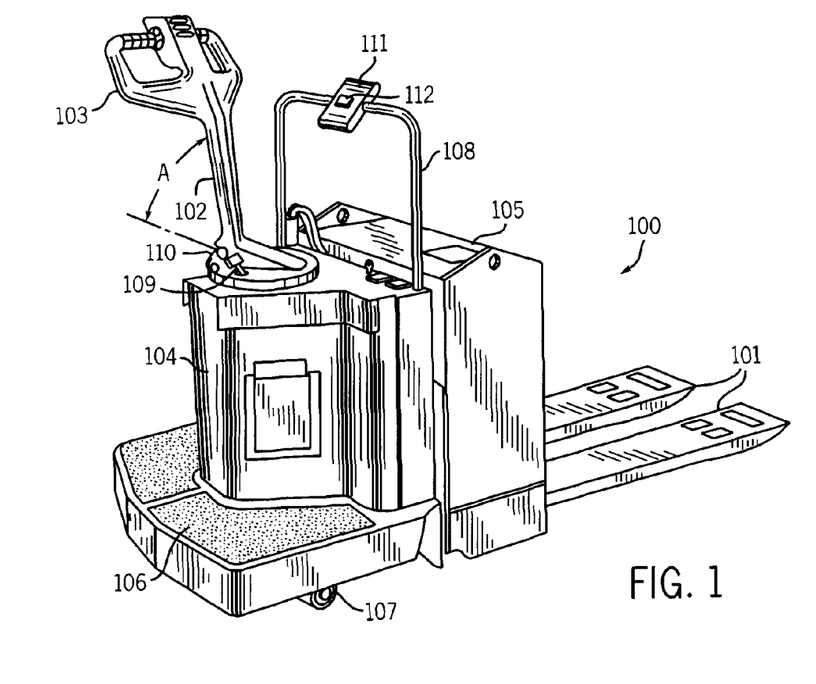
FIG. 1 is a perspective view of a pallet track construction in accordance with the present invention.

Referring now to the Figures, and more particularly to FIG. 1, a perspective view of a pallet truck 100 having a load bearing fork 101 is shown. The truck 100 includes a steering arm 102 and steering arm handle 103, and is also provided with a traction motor (not shown) enclosed in a motor housing 104, a storage battery (not shown) enclosed in a battery housing 105, and a steerable wheel (not shown) located under a platform 106. The truck 100 is also usually equipped with small stabilizing casters 107 and a hand rail 108 that can be grasped by a riding operator standing on the platform 106.

The truck 100 is steerable by moving the steering arm 102 and handle 103 from side to side. The steering arm 102 is also movable up and down through an arc A that ranges from a nearly horizontal to a substantially vertical position and includes both driving and braking arcs. When the steering arm 102 is disposed in a near or substantially vertical position (as depicted in FIG. 1) or a near or substantially horizontal position, a switch (not shown) cuts power to the drive motor and actuates a brake to stop the vehicle. The vehicle brake can be engaged either manually by the operator forcing the arm 102 to a substantially vertical or horizontal position, or, in the situation where the operator releases the arm 102 while the truck is in motion, by activation of a deadman brake mechanism that automatically returns the arm 102 into a brake position. Engagement of the brake under the latter circumstances may be prevented by a deadman brake override device that allows the vehicle to operate in a coast mode. Devices for providing this function are shown, for example, in U.S. Pat. Nos. 5,964,313 and 6,464,025, which are hereby incorporated herein by reference for their description of these devices.

Figure 2:
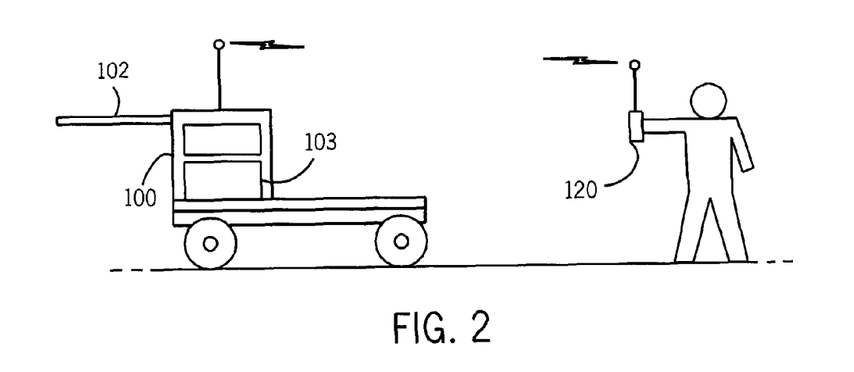
FIG. 2 is a block diagram illustrating the components for remotely controlling a pallet truck.

"Coast" functions, or deadman brake override devices, are typically engaged by the operator using manual switches provided on the vehicle. These devices deactivate the deadman brake mechanism, allowing the vehicle to "coast to a stop" when an operator releases the arm 102. Referring now to FIG. 2, as shown here, the operator can engage the coast function on the vehicle using a remote control device 120 including a wireless transmitter or transceiver. A vehicle control system log (FIG. 3, described below) verifies that the vehicle control arm 102 is in its normal driving position and the steering wheel is generally pointed straight ahead, and can activate the coast mechanism. The wireless transmitter on the remote control device 120 sends a signal to a receiver or transceiver on the vehicle 100, as described below, and if the signal is encoded correctly for that vehicle, the vehicle control system 109 engages the coast function, also as discussed below.

Figure 3:
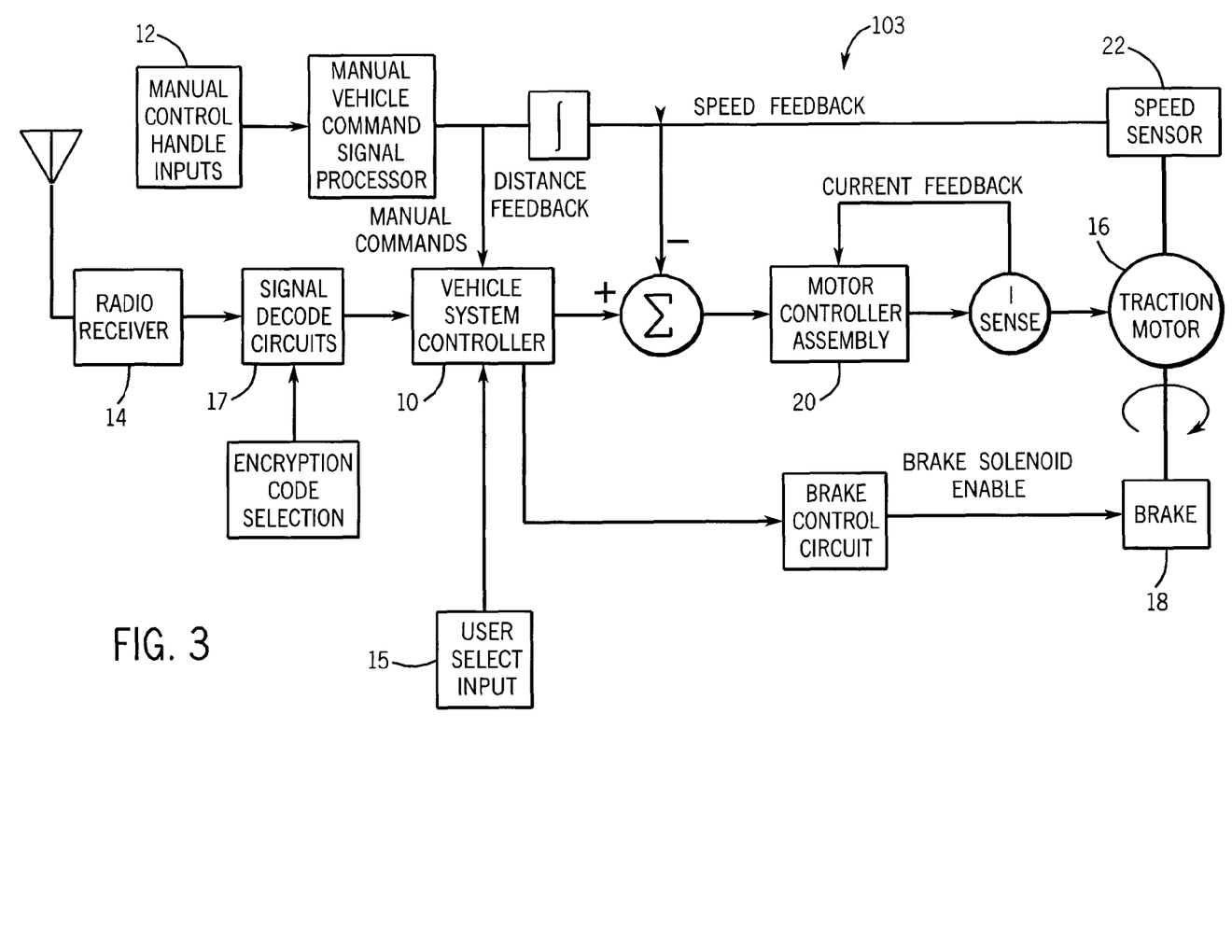
FIG. 3 is a block diagram of a vehicle control system for remote control of a pallet truck.

Referring now to FIG. 3 a block diagram of a vehicle control system 109 for operating the vehicle 100 is shown. The vehicle control system 109 includes a system controller 10 that receives input commands from a manual control handle 12 on the handle 103, and a radio receiver 14. The controller 10 produces output signals for controlling a brake 18, and a motor control circuit 20, that in turn controls a traction motor 16 based on feedback from a speed sensor 22. The manual control handle 12 can include a speed control potentiometer, high speed switch, coast, jog, emergency reverse switch, and other functions. The steering arm 102 also provides control signals as part of the manual control handle 12.

Figure 4:
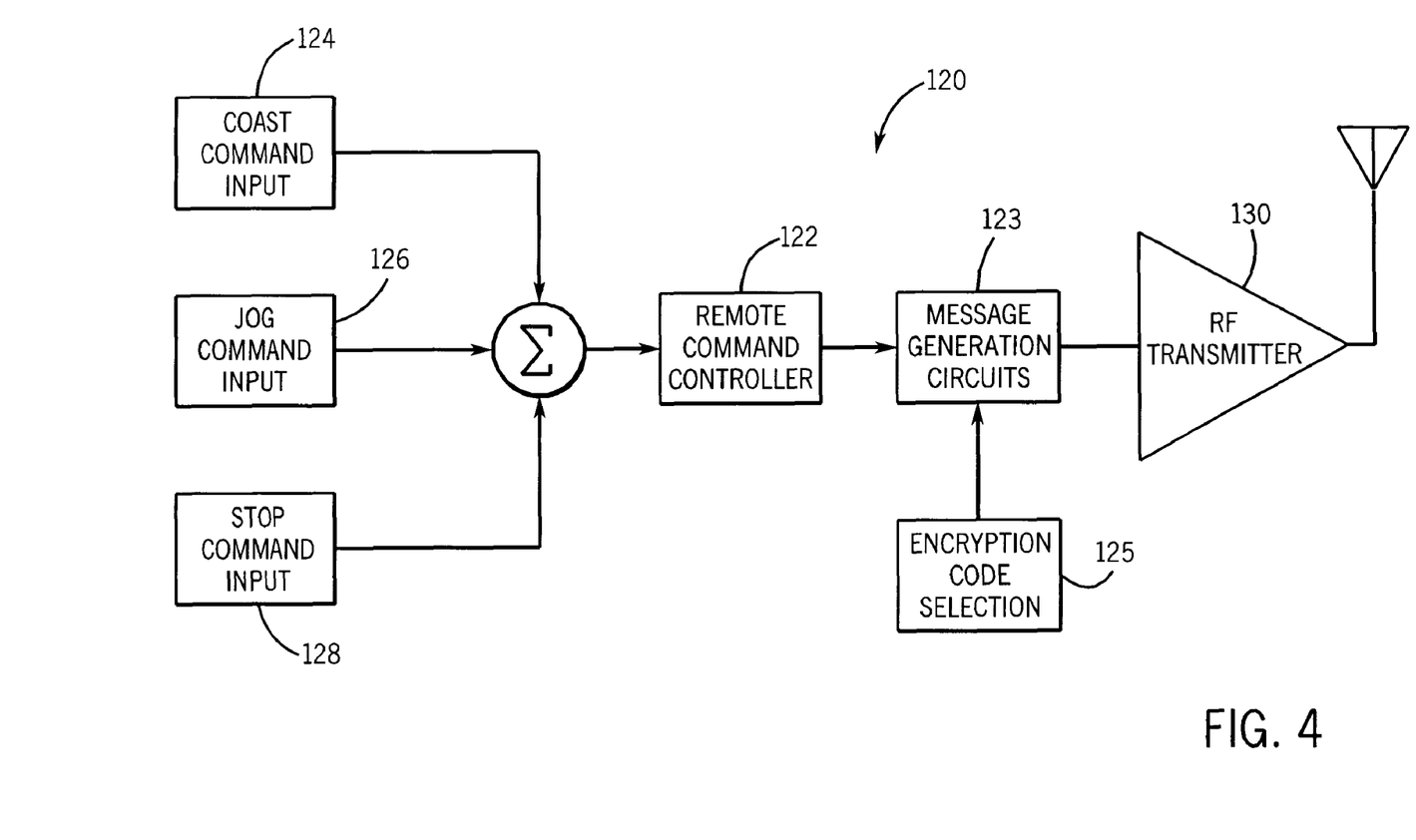
FIG. 4 is a block diagram of a remote control device for controlling the vehicle control system of FIG. 3.

Referring still to FIG. 3 and also to FIG. 4, the radio receiver 14 receives wireless signals from a remote control device 120 shown in FIG. 4. In one embodiment, the remote control device 120 includes a controller or processor 122, three control switches 124, 126, and 128, and a transmitter or transceiver such as an Radio Frequency (RF) transmitter 130. The controller 122 receives input signals from the three switches, which can include a coast command, a jog command, and a stop command actuator, 124, 126, and 128, respectively, and, using message generation circuit 123, produces an output command message, that is encrypted using a selected encryption code 125. The encrypted command message is transmitted to the vehicle control system 109 via electromagnetic means, such as by an RF transceiver or transmitter 130, as shown here. In one embodiment, the RF transmitter 130 generates a RF signal in the UHF range of operation. That signal, while limited in power to approximately 15 dBm, is sufficient to reach the vehicle within a range of 5-10 meters.

Although a specific type of transmitter is described here, various other types of RF and other wireless transmission signals could also be used. Furthermore, although in the embodiment described above, three switches 124, 126, and 128 are described, in alternate embodiments, the jog switch 126 can be used to both provide a travel request signal and activate a coast function as described in U.S. Pat. No. 5,964,313, which is incorporated herein by reference for its description of this system. Furthermore, it will be apparent that one or more of the switches 124, 126, and 128 can be provided in the remote control device 120, and the remainder can be provided on the truck 100 as, for example, on the handle 103, on the grab bar 108, or mounted on the motor and battery housings 104 and 105. In still further embodiments, all of the switches 124, 126, and 128 could be provided on the truck 100, or a combination of switches could be provided both on the truck 100 and in the remote control device 120. Furthermore, duplicate sets of switches can be provided in one truck and in the remote control device 120. Additionally, although switches are specifically described, it will be apparent that various types of actuators can be used in this application.

Referring now to FIG. 1, in operation, when the operator is riding on the vehicle 100, the travel command comes directly from the manual controls 12 or from switches provided elsewhere on the vehicle, as described above. In this case, the identity of the signal origin is already known and the original does not need to be decoded or transmitted.

Referring again to FIGS. 3 and 4, in the case where the operator is not on the vehicle, the remote control 120 is held by the operator, and the operator generates signals for commanding the vehicle by activating any one of the three actuators or switches 124, 126, and 128. Signals from the switches are received by the processor 122, which turns the input command into a digital signal, and applies an encryption code 125. Because of the likelihood of a similar vehicle being in the vicinity, it is important that the signal from one operator not be confused with that of another. Therefore, the encryption code 125 for each vehicle 100 and remote control 120 combination is unique. The most common methods of encoding signals for this type of operation are either through use of a digital code or by selecting unique frequencies for each remote controller/vehicle pair. The method with the greatest number of unique address codes is the digital code method. By pre-selecting the code on both the remote transmitter and the receiver, as many as 255 operator/vehicle pairs can be in operation in relative close proximity without crosstalk of signal or interference. As described above, in addition to digital encoding, it is also possible to use unique frequencies for each vehicle, in a manner similar to the use of bell tones in telephones.

Once the signal is encrypted, it is sent to the RF transmitter 130, where it is amplified, modulated with a carrier frequency and sent to the receiver 14 in the vehicle 100. The encrypted signal is received at the antenna of the receiver 14, and is demodulated from its carrier by the receiver circuit. The signal decode circuits 17 compare the encryption of the incoming signal to the encryption code for the corresponding vehicle stored in memory. If the incoming signal does not match the code in memory, it is ignored. If there is a match, the signal is then passed to the controller 10. When the Jog button 126 is activated, the controller 10 applies motive power to the traction system 16 to move the vehicle forward. When the stop button 128 is activated, the controller 10 removes motive power and engages the brake 18. When the coast button 124 is activated, the controller 10, restrains the steering arm 102 in the driving arc, preventing activation of the deadman brake when the handle 102 is released and allowing the vehicle 100 to move while the operator walks alongside, as described below. The controller 10 can be programmed through a user select input or selector 15 that can be, for example, a series of switches, a keyboard input to the controller 10, a touch screen, or various other input devices that will be apparent to those of skill in the art. The user select input 15 allows the operator to select between coast control modes to either: (1) apply the motive force to the traction motor 16 as long as the jog button 126 is depressed (constant pressure coast control mode); (2) apply a motive force to the traction motor 16 for a preselected period of time each time the jog button 126 is depressed (time coast control mode); (3) apply a motive force to the traction motor 16 necessary for the truck to travel for a predefined distance each time the jog button 126 is depressed (distance coast control mode), as discussed below.

Figure 5:
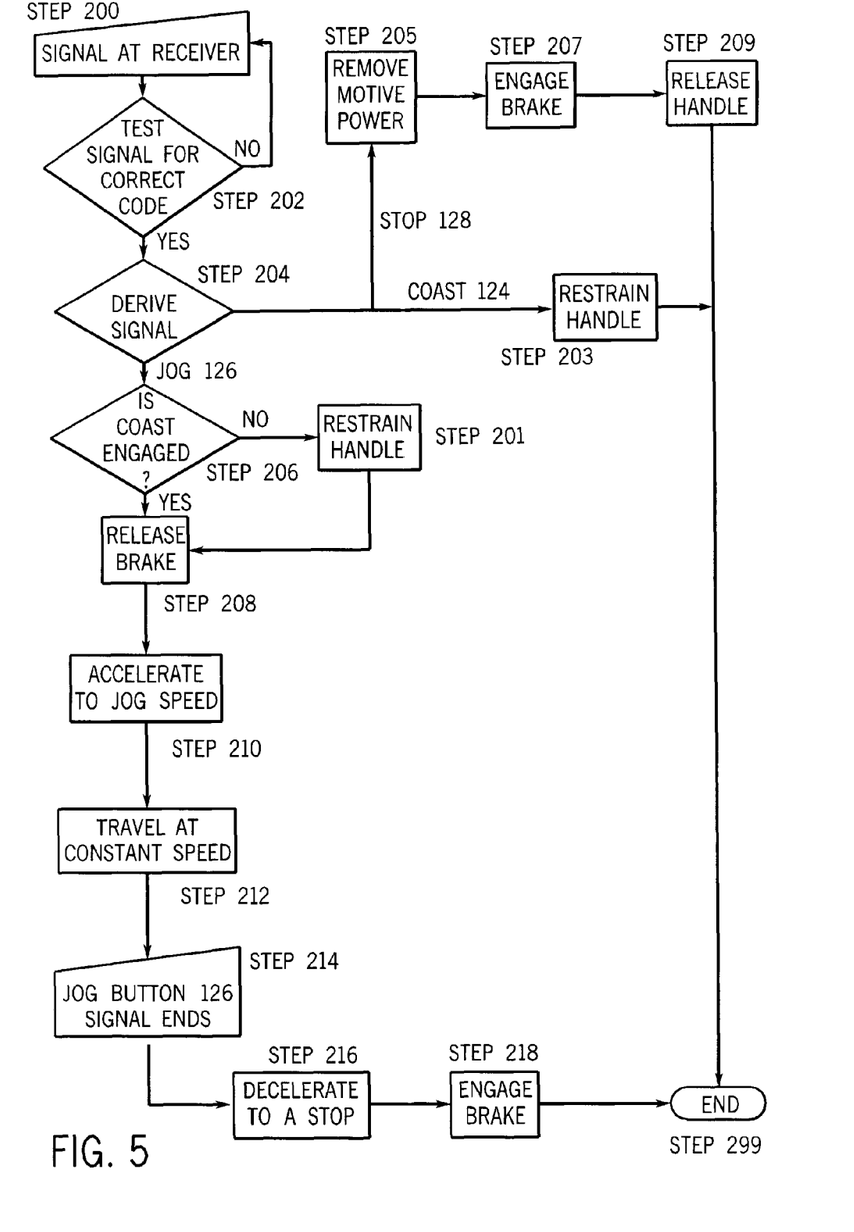
FIG. 5 is a flow chart illustrating a constant pressure mode control of coast function.
Figure 6:
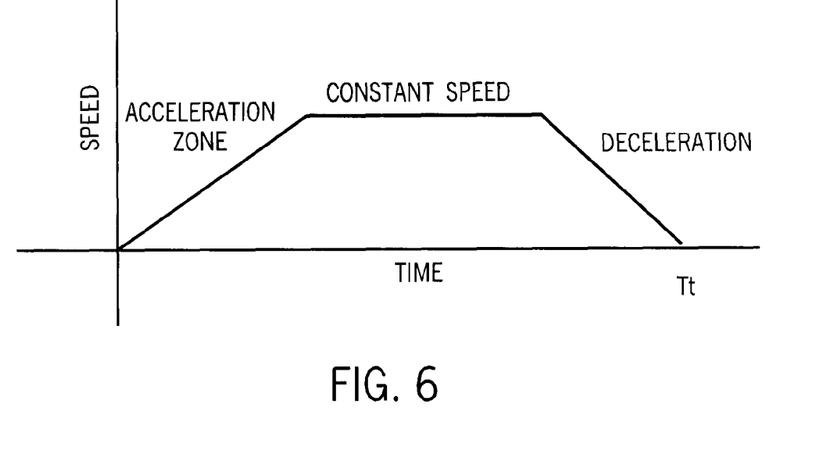
FIG. 6 is a schematic diagram illustrating the constant pressure mode control of FIG. 5.

Referring now to FIGS. 5 and 6, a flow chart and a schematic for control of the vehicle 100 by the vehicle controller 109 in a constant pressure coast mode are shown, respectively. In the constant pressure coast mode, when the coast switch 124 is activated from the remote control device 120, the vehicle's steering arm 102 will be restrained as described above. When the jog button 126 is activated, the vehicle system controller 10 restrains the steering arm 102 if coast mode is not already engaged, releases the brake and accelerates the vehicle 100 to a fixed speed and travel at that speed for as long as the jog button 126 is activated. When the activation of jog button 126 ends, the vehicle 100 coasts to a stop. The total time for travel (Tt) can then be determined by the length of time the Jog button 126 is depressed.

Referring now specifically to FIG. 5, a flow chart, illustrating the steps of performing a constant pressure coast function for the vehicle 100 is shown. When the vehicle control 103 receives an input signal at the receiver 14 (step 200), the controller 10 evaluates the signal (step 202) to determine whether it is intended for the vehicle 100 receiving the signal. If not, the controller returns (step 200), waiting for an input signal at the receiver 14. If the input signal matches the vehicle 100, the controller decodes the signal (step 204) to determine which of the switches 124, 126, and 128 provided the signal. If the signal is from the stop button 128 the controller removes motive power from the vehicle (step 205), engages the brake (step 207) and releases the restraint of the steering arm 102 (step 209). If the signal is from the coast button 124 the controller restrains the handle in the operating range (step 203) thereby deactivating the deadman brake mechanism, allowing "coast" to be functional on the vehicle. If the signal is from the Jog Button 126 the controller will check if coast is engaged (step 206) and if coast is not already engaged the controller restrains the handle in the operating range (step 201) thereby deactivating the deadman brake mechanism, allowing "coast" to be functional on the vehicle. The controller 10 releases the brake 18 (step 208) and causes the vehicle 100 to accelerate to a predetermined speed (step 210). The truck will travel at a constant speed (step 212) until the signal from the jog switch ends (step 214) at which time the vehicle 100 is decelerated to a stop (step 216) and, finally the brake 18 is engaged (step 218).

Figure 7:
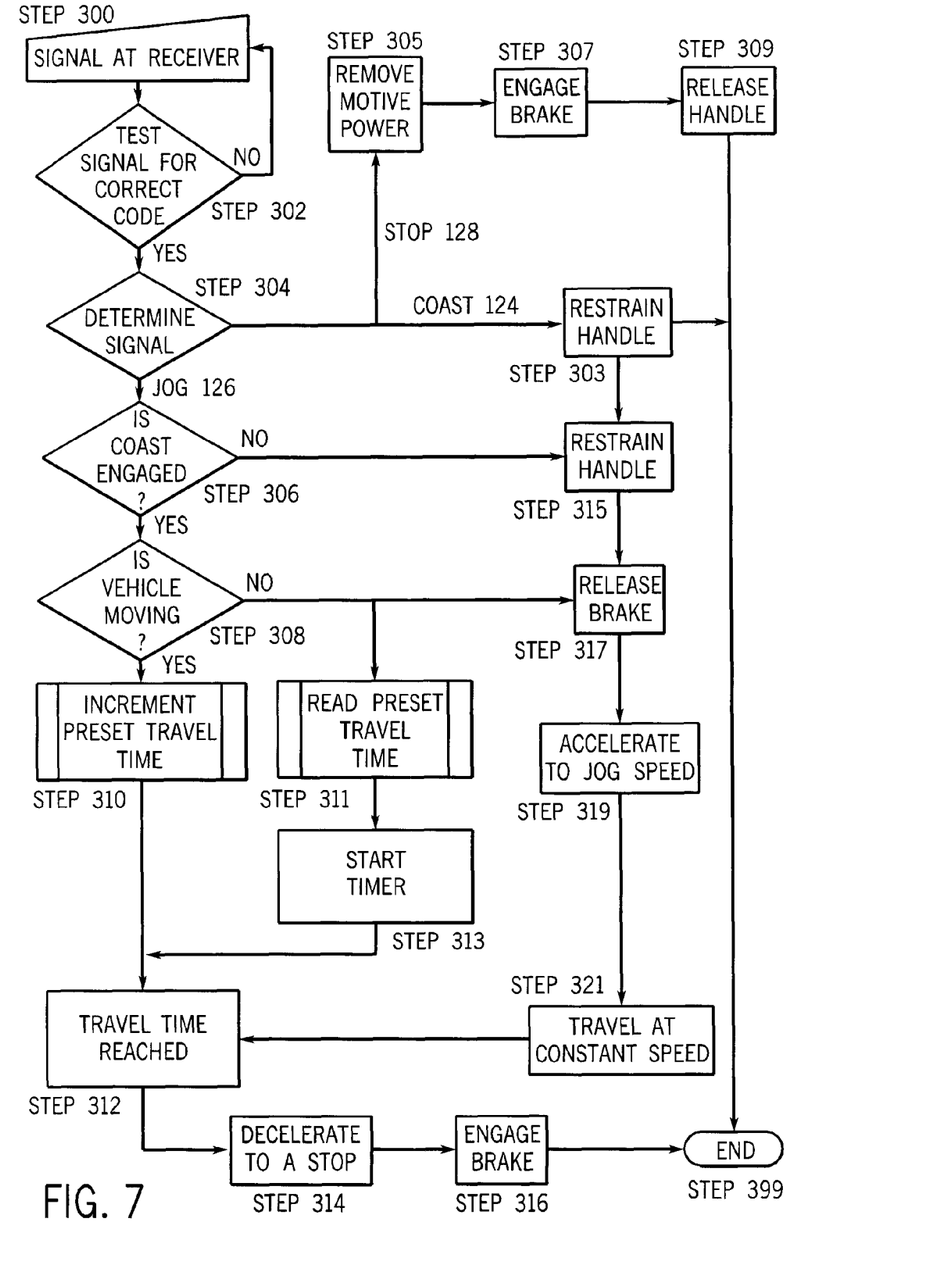
FIG. 7 is a flow chart illustrating a time control of coast function.
Figure 8:
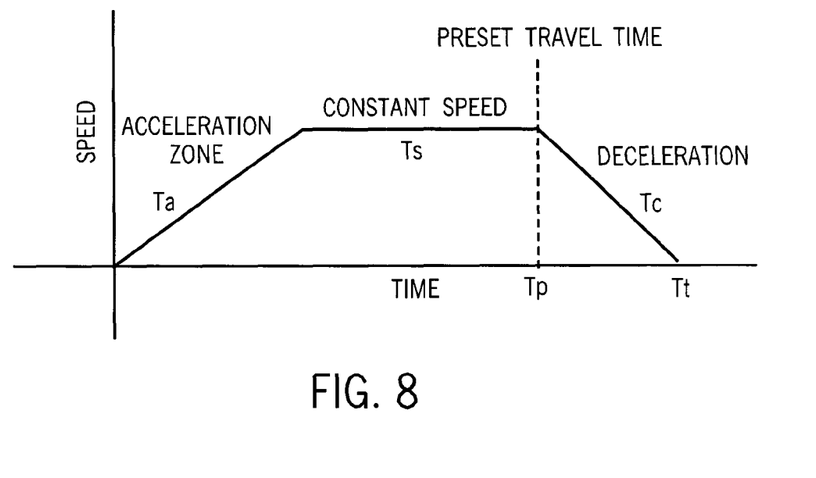
FIG. 8 is a flow chart illustrating the time control at FIG. 5.

Referring now to FIGS. 7 and 8, in the time coast control mode, when the coast button 124 is activated from the remote control 120, the vehicle's steering arm 102 is restrained as described above. When the jog button 126 is activated, the vehicle system controller 10 causes motion for a fixed period of time at a fixed speed and then the vehicle 100 coasts to a stop. If the vehicle 100 is not moving when the jog switch 126 is activated, the vehicle accelerates for a fixed period of time (Ta). The total time for powered vehicle travel (Tp) is determined by the number of times the jog switch 126 is activated within a set period of time. For example, if the total period of time per activation is set to 3 seconds, and the measured acceleration time (Ta) is 1.2 seconds then the time for travel at a fixed speed (Ts) will be 1.8 seconds, as given by the following equations:

$$Tp = Ta + Ts \text{ or } Ts = Tp - Ta$$

If the jog switch is activated again within a pre-determined set period of, e.g. 2 seconds, the total powered travel time (Tp) is incremented by a predetermined amount. The timing sequence for the total time calculator is processed in the vehicle system controller 10 and is also shown in flow chart FIG. "7" discussed below. Remote jog requests received within a set period of time are accumulated to calculate the total powered travel time Tp. Once the total powered travel time has been reached the vehicle will coast to a stop (Tc). Total travel time (Tt), is given by the following equations:

$$Tt = Tp + Tc \text{ or } Tc = Tt - Tp$$

The vehicle's travel control system is a closed-loop motor controller with speed feedback which allows the vehicle system controller 10 to monitor the vehicle's actual speed and adjust the acceleration time accordingly.

Referring now specifically to FIG. 7, a flow chart illustrating the steps of the time coast control mode is shown. When the vehicle control 109 receives an input signal at the receiver 14 (step 300), the controller 10 evaluates the signal (step 302) to determine whether it is a correct signal for the vehicle 100 receiving the signal. If not, the controller returns (step 300), and waits for an input signal at the receiver 14. If the input signal matches the vehicle 100, (step 302) the vehicle system controller 10 decodes the signal (step 304). If the signal is from the stop switch 128 the controller 10 removes motive power from the vehicle (step 305), engages the brake (step 307) and releases the handle restraint (step 309). If the signal is from the coast switch 124 the controller 10 restrains the handle 102 in the operating range (step 303) thereby deactivating the deadman brake mechanism, allowing "coast" to be functional on the vehicle 100. If the signal is from the jog switch 126 the controller 10 verifies whether coast is engaged (step 306) and if coast is not already engaged the controller 10 restrains the steering arm 102 in the operating range (step 301) thereby deactivating the deadman brake mechanism, allowing "coast" to be functional on the vehicle 100. The controller 10 releases the brake 18 (step 317) and causes the vehicle 100 to accelerate to a predetermined speed (step 319), and then to travel at a constant speed (step 321). If an additional jog input is received from the jog switch 126 while the vehicle 100 is moving (step 308) the preset travel time will be incremented by a preset amount (step 310). Once the travel time has been reached (step 312) the vehicle 100 is decelerated to a stop (step 314) and, finally the brake 18 is engaged (step 316).

Figure 9:
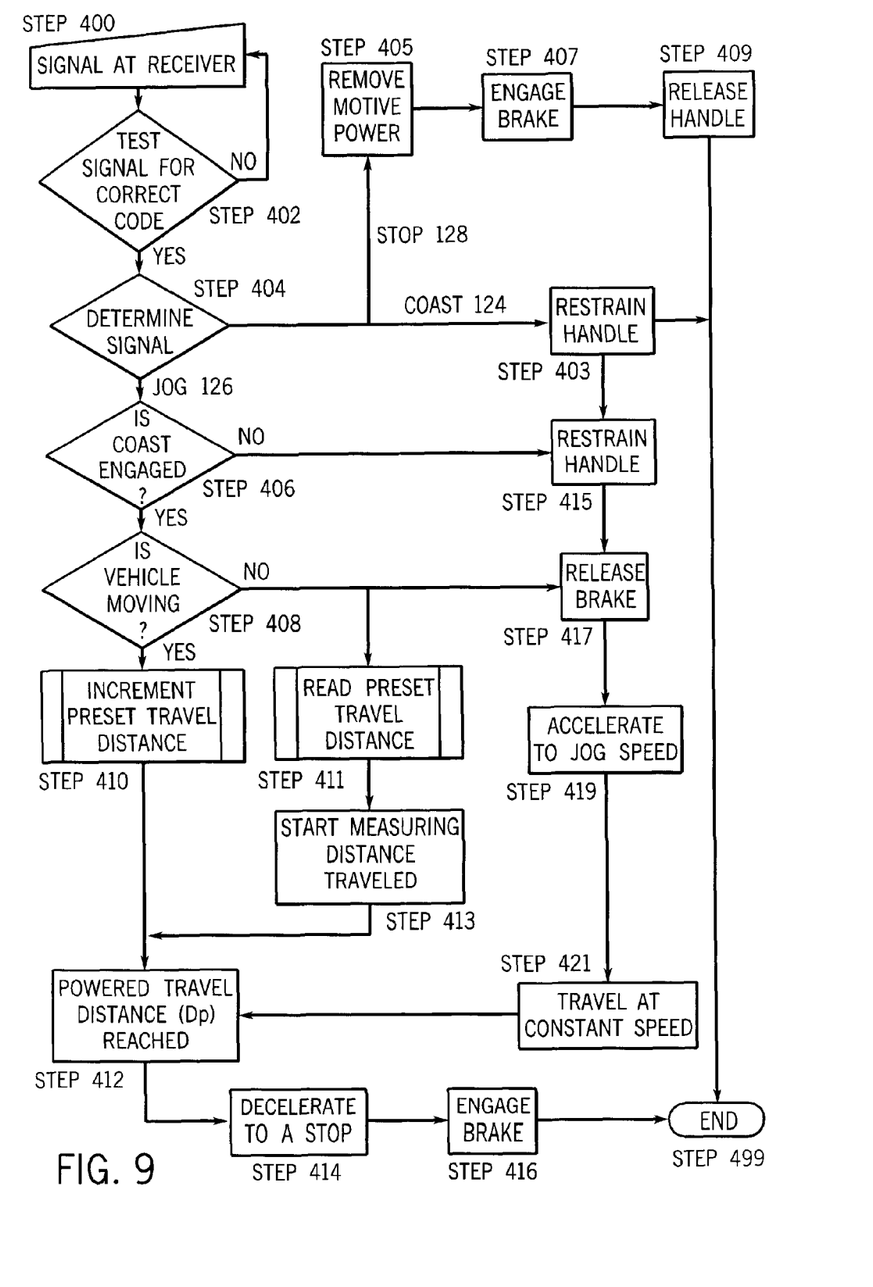
FIG. 9 is a flow chart illustrating a distance control of coast function.
Figure 10:
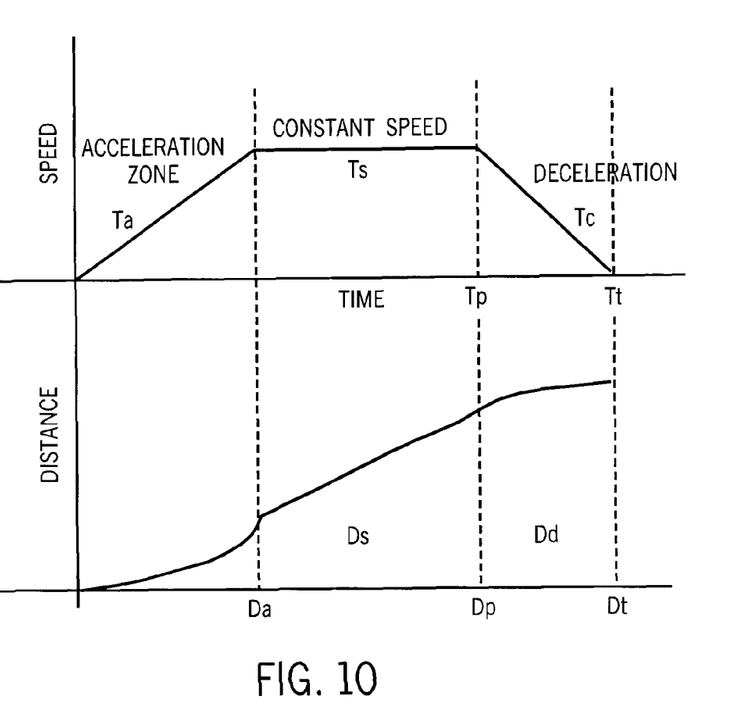
FIG. 10 is a schematic diagram illustrating the distance control of coast of FIG. 9.

Referring now to FIGS. 9 and 10, in another alternative mode, the vehicle control system 109 provides a distance-based control of the vehicle movement. Here, when the coast switch 124 is activated on the remote control device, the vehicle's brake 18 is released, as described above. If the vehicle 100 is configured to travel a fixed distance when the remote jog switch 126 is pushed, the vehicle 100 advances the fixed distance, a distance that includes both a motion and a stopping distance. When the distance control is enabled, the operator only has to push the remote jog 126 to cause the vehicle 100 to move a set distance; the jog button 126 does not have to be held continuously closed. For example, if the job switch 126 is pushed once and the total travel distance (Dt) is set to 3 feet, the vehicle will travel 3 feet before coming to a stop. If the jog switch 126 is pushed twice within a predetermined time, e.g. 2 seconds, the total travel distance (Dt) will be 6 feet, etc. The controller 10 calculates the total travel distance (Dt) from the number of times the jog switch 126 is activated as shown in the flow diagram in FIG. 10.

The vehicle control system 109 uses a closed-loop motor controller with speed and distance feedback to control the distance traveled in this mode. The distance feedback is acquired by integrating the speed feedback with respect to time. Because it is a closed-loop control system, the acceleration distance (da) and deceleration distance (dd) are regulated, known in advance and stored in memory. Based on this feedback, the controller 113 calculates the travel distance at constant speed (ds) as follows:

$$Dt=da+ds+dd \text{ and } ds=Dt-(da+dd)$$

In the event that the vehicle is already moving when the jog switch 126 is activated, the acceleration distance (da) will be reduced. With speed and distance feedback, the conditions of the vehicle at the time the jog command signal is received are known. The acceleration distance is then reduced and the corresponding travel distance at constant speed is increased.

Referring now specifically to FIG. 9, a flow chart illustrating the steps of the distance coast control mode of the vehicle 100 is shown. When the vehicle control 109 receives an input signal at the receiver (step 400), the controller 10 evaluates the signal (step 402) to determine whether it is a correct signal for the vehicle 100. If not, the controller returns (step 400), waiting for an input signal at the receiver 14. If the input signal matches the vehicle 100, the controller decodes the signal (step 404). If the signal is from the stop switch 128 the controller removes motive power from the vehicle (step 405), engages the brake (step 407) and releases the handle restraint (step 409). If the signal is from the coast switch 124 the controller restrains the handle in the operating range (step 403) thereby deactivating the deadman brake mechanism, allowing "coast" to be functional on the vehicle. If the signal is from the jog switch 126 the controller will check if coast is engaged (step 406) and if coast is not already engaged, the controller 10 restrains the handle 102 in the operating range (step 415) thereby deactivating the deadman brake mechanism, allowing "coast" to be functional on the vehicle 110. The controller 10 releases the brake 18 (step 417) and causes the vehicle 100 to accelerate to a predetermined speed (step 419). The truck 100 travels at a constant speed (step 421) until the powered travel distance (Dp) is reached (step 421) at which time the vehicle 100 is decelerated to a stop (step 414) and, finally, the brake 18 is engaged (step 416).

When using any of the constant pressure, time control or distance control coast modes or functions described above, the operator does not need to return to the vehicle's control handle at regular intervals to keep the vehicle moving. Therefore the present invention allows the operator to maintain control of the vehicle without returning to the vehicle. In a typical pick operation, for example, the time sequences apply as shown in Table 1:

TABLE 1

| | |
|---|---|
| Steps away from the vehicle, walks to pick site | 5 seconds |
| Identifies and picks item | 10 seconds |
| Walks back to the vehicle | 5 seconds |
| Places the item on the forks | 2 seconds |
| Returns to the vehicle controls | 3 seconds |
| Advances to the next pick site | 5 seconds |
| Total time per pick | 30 seconds |

In a typical pick, therefore, ⅓ of the time (10 seconds) is spent moving to the pick site and back. In most instances, the item to be picked is small. Using the present invention, an operator can move to the first pick location, activate the coast switch, step off of the vehicle, retrieve an item, move to another location nearby and retrieve a second item without having to return to the vehicle, thereby saving the extra travel time to and from the vehicle. In some instances, more than two pick sites could be accessed in a single trip, further improving productivity.

Using the example from above, if one set of travel times to the vehicle and back can be saved for every 2 picks, that would be a savings of 10 seconds out of 60, or a 16.7% improvement. If the operator could maintain a 120 pick-per-hour rate before this improvement, now a rate of 140 picks-per-hour or higher is achievable.

As a further feature of this invention, a sensor system can be included to detect the end of an aisle or other boundary as determined by the area of operation. The sending system, typically using technology such as photoelectric lights with reflector (or RFID proximity sensing as an alternate construction) detects the boundary as it approached. If the vehicle is in the coast mode of operation, all power to the travel circuits is interrupted and the brake is applied. This feature also assists in preventing the vehicle from intruding into a traffic aisle or other similar area. Sensing the approach of a specified boundary improves both productivity and affords additional opportunities to aid the operator in stopping the vehicle as compared to the prior art.

Figure 11:
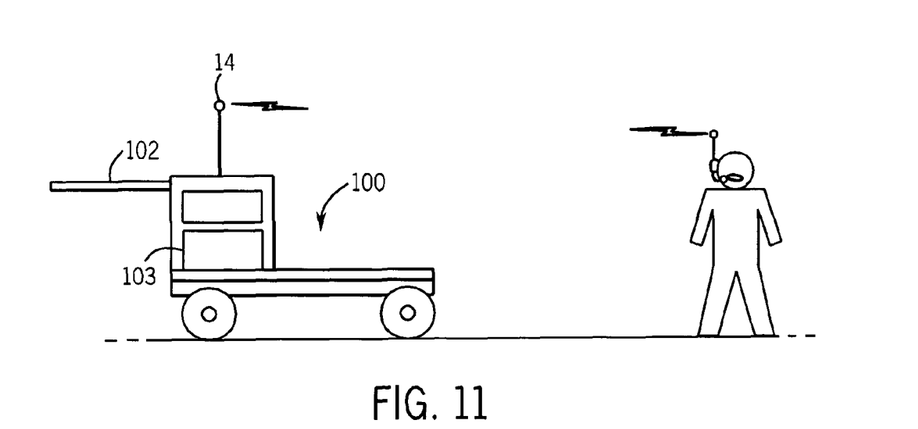
FIG. 11 is a schematic illustrating voice control of coast.

In yet another embodiment of the invention, a voice control can be provided to allow the operator to speak commands into a microphone that command the truck to "GO," "STOP," etc. (see FIG. 11). In earlier noted implementations, the button switch electrical signal was sent in a wireless manner to a receiver on the vehicle. In this implementation, the operator's voice commands, having been learned by the voice-control circuitry, are converted into electrical signals similar to those created by the remote device used in the alternate embodiments described above. The operator wears a microphone or headset, and the voice command is converted into an electrical signal, interpreted by the voice recognition circuitry and a truck instruction is generated. The voice command signal is coded with a unique identification for the assigned truck in order to prevent the command from being inadvertently received and used by another vehicle in the vicinity. In the vehicle, the digitized voice command is then translated into vehicle motion signals.

In an alternate construction, the microphone is installed on the truck, and the voice recognition circuitry resides on the truck. This method of implementation is particularly useful if there was little background noise and the operator remained close to the truck.

The actual control of the truck, once the command has been received by the vehicle, can be provided by traveling a fixed time or distance, as described above with respect to the first and second alternate embodiments. The unique feature in this implementation is the ability to control the vehicle's movement in a hands-free model leaving the operator's hands available to handle the cargo or other tasks.

The present invention, therefore, provides a number of advantages over the prior art. In the earlier implementations of a coast feature, the operator was required to keep his/her hand on the button or switch on the vehicle that engages coast. As soon as the operator stepped away from the vehicle to pick up an object from a storage location, the vehicle would immediately start "coasting" to a stop. Depending on the gross weight of the vehicle and load, the slowdown period would range from a few to perhaps 10 meters. Because the speed of the vehicle in coast is limited to 3.5 MPH, and the command signal to drive the vehicle is discontinued as soon as the operator is no longer in contact with coast actuation switch on the vehicle, the distance that the vehicle can roll when unattended is limited. By allowing the operator to control coast action while separated from the vehicle, the operator can more efficiently pick up items and position the items on the load bed, allowing more items to be picked in a given time period.

Although the invention has been described above as including coast, jog and stop switches 124, 126, and 128 on a remote control device 120, it will be apparent that these switches can also be provided on the truck 100 mounted in any of a number of locations including, for example, to the steering arm control handle 103, to the grab bar 108 provided on the truck 100, or to the motor 104 or battery housing 105. Here, the user interface or selector 15 would be used to select between a constant pressure, time, and distance coast function, and the switches 124, 126, and 128 would operate substantially as described above, but would provide input directly to the vehicle control system 109 and processor 122, rather than through an encrypted wireless link. Furthermore, although the remote control device 120 is described as including only switches 124, 126, and 128, it will be apparent that the user interface 15 for selecting between the various coast function types could also be provided on the remote control device 120.

Although specific embodiments have been shown and described, it will be apparent that a number of variations could be made within the scope of the invention. It should be understood therefore that the methods and apparatuses described above are only exemplary and do not limit the scope of the invention, and that various modifications could be made by those skilled in the art that would fall under the scope of the invention. To apprise the public of the scope of this invention, the following claims are made:

We claim:

1. An improved pallet truck having a deadman brake that activates upon release of the operator controls, and a coast system for selectively overriding the deadman brake to allow the vehicle to coast, the improvement comprising a selector for selecting between a constant pressure-controlled coast function, a time controlled coast function, and a distance controlled coast function.

2. The pallet truck of claim 1, further comprising a remote control including at least one actuator for activating the selected coast function.

3. The pallet truck of claim 2, wherein the remote control comprises a wireless control system.

4. The pallet truck of claim 2, wherein the remote control comprises a voice activated system.

5. The pallet truck of claim 2, wherein the remote control device further comprises a wireless transceiver and at least one actuator for actuating the selected coast function.

6. A pallet truck comprising:
a steerable wheel;
a brake coupled to said wheel;
a steering arm coupled to said wheel for steering said wheel, the steering arm being movable through an arc including a driving arc interposed between a generally vertical braking position and a generally horizontal braking position;
a deadman mechanism coupled to said steering arm for moving said steering arm into at least one of said generally vertical braking position and said generally horizontal braking position to brake said truck when said steering arm is released;
a vehicle control system receiving control signals from said steering arm and providing control signals to said brake;
a coast device coupled to said steering arm for locking said steering arm within said driving arc, said coast device preventing movement of said steering arm from activating the deadman mechanism when the steering arm is released;
a selector for selecting between a time control coast function, a distance control coast function, and a constant pressure coast function; and
a remote control for activating said coast device, the remote control providing a coast signal to the vehicle control system to activate the selected one of the time control coast function, the distance control coast function and the constant pressure coast function.

7. The pallet truck as defined in claim 6, wherein the vehicle control system includes a transceiver for receiving the signal from the remote control device.

8. The pallet truck as defined in claim 6, wherein the remote control device includes a controller programmed to encrypt the signal, and the vehicle control system includes a controller programmed to decrypt the signal and to determine whether the signal is provided for a specific truck.

9. The pallet truck as defined in claim 6, wherein the remote control provides a coast signal for activating the coast device, a stop signal for activating the brake, and a jog signal for activating a traction motor and applying a motive force to the truck.

10. The pallet truck as defined in claim 6, wherein the vehicle control system is programmed to monitor the signal from the remote control device and when the constant pressure coast function is selected, to drive the pallet truck at a predetermined speed while the signal is received.

11. The pallet truck as defined in claim 6, wherein the vehicle control system is programmed to monitor the signal from the remote control device and when the time control coast function is selected, to accelerate the pallet truck at a predetermined acceleration rate for a selected acceleration time period, to drive the pallet truck at a predetermined speed for a selected drive time period, and to decelerate the pallet truck at a predetermined deceleration rate for a selected deceleration time period.

12. The pallet truck as defined in claim 11, wherein the vehicle control system is further programmed to monitor the coast signal from the remote control device and to increment the selected time period to drive the pallet truck as a function of a number of actuation requests received.

13. The pallet truck as defined in claim 6, wherein the vehicle control system is programmed to monitor the signal from the remote control device and when the distance control coast function is selected, to retrieve an acceleration and a deceleration distance from a memory storage, accelerate the pallet truck for the predetermined acceleration distance, calculate a distance at a constant speed of the vehicle, and to drive the pallet truck at a predetermined distance.

14. The pallet truck of claim 13, wherein the acceleration distance is determined based on a stopped vehicle, and the vehicle control system is further programmed to adjust the acceleration distance as a function of the speed of the vehicle when the signal is received.

15. The pallet truck of claim 6, wherein the remote control device includes a processor programmed to encrypt the signal for a specific pallet truck.

16. The pallet truck of claim 15, wherein the vehicle control system is programmed to decrypt the signal and to determine if the signal is intended for the pallet truck.

17. The pallet truck of claim 6, wherein the remote control device further includes a stop actuator and a jog actuator providing a stop signal and a jog signal, and wherein the vehicle control system is programmed to actuate the coast mechanism when the coast signal is received, drive the pallet truck as a function of the selected one of the time control coast, the distance control coast, or the constant-pressure coast when the jog signal is received, and stop the pallet truck when the stop signal is received.

18. A pallet truck comprising:
   a steerable wheel;
   a brake coupled to said steerable wheel;
   a steering arm coupled to said wheel for steering said wheel, the steering arm being movable through an arc including a driving arc interposed between a generally vertical braking position and a generally horizontal braking position;
   a deadman mechanism coupled to said steering arm for moving said steering arm into at least one of said generally vertical braking position to brake said truck when said handle is released;
   a vehicle control system receiving control signals from said steering arm and providing control signals to said brake;
   a coast device coupled to said steering arm for locking said steering arm within said driving arc, said coast device preventing movement of said steering arm from activating the deadman mechanism when the steering arm is released;
   a selector for selecting between a time control coast function, a distance control coast function and a constant pressure coast function; and
   at least one coast actuation control for activating the coast device and providing a signal to the vehicle control system to activate the selected one of the distance control coast function, the time control coast function, and the constant pressure coast function.

19. The pallet truck of claim 18, wherein the coast actuation control is provided on the vehicle.

20. The pallet truck of claim 18, wherein the coast actuation control is provided on a remote control device.

21. The pallet truck of claim 19, wherein the coast actuator comprises a coast switch and a jog switch.

* * * * *